March 14, 1967 R. C. BUELER 3,309,149
COMBINED SERVICE AND EMERGENCY BRAKE SYSTEM
Filed Dec. 3, 1965
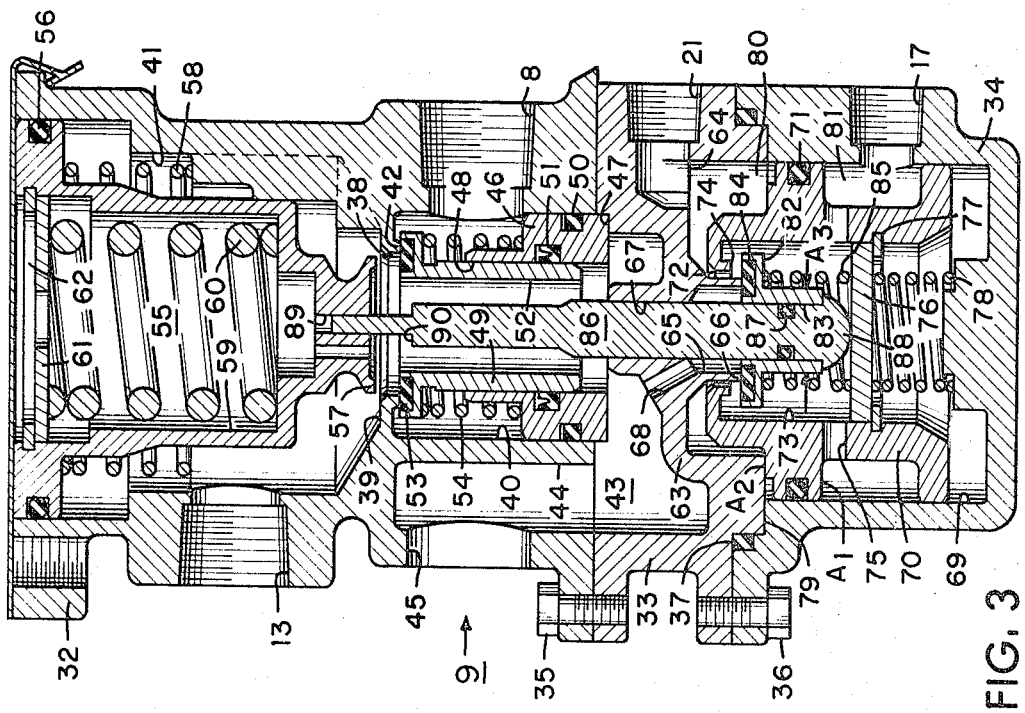
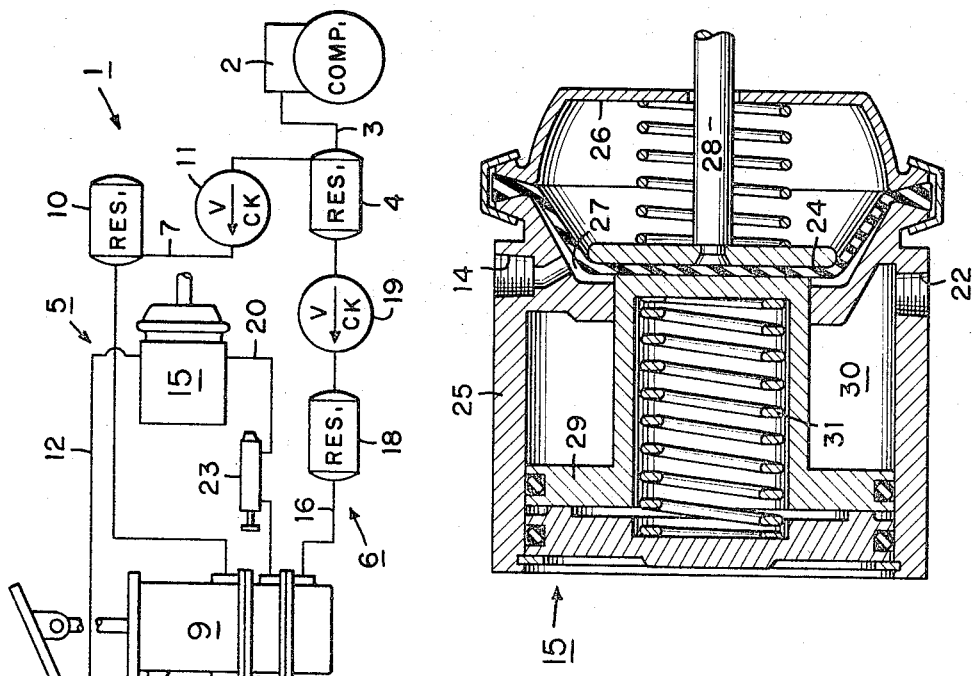
INVENTOR
RICHARD C. BUELER
BY
*Joseph E. Papin*

3,309,149
COMBINED SERVICE AND EMERGENCY
BRAKE SYSTEM
Richard C. Bueler, Glendale, Mo., assignor to Wagner
Electric Corporation, St. Louis, Mo., a corporation of
Delaware
Filed Dec. 3, 1965, Ser. No. 511,860
19 Claims. (Cl. 303—13)

This invention relates to fluid pressure systems and control valves therefor and in particular to those control valves for effecting both service and emergency energization of said fluid pressure systems.

In the past fluid pressure systems for a vehicle or the like, a control valve was operable to selectively apply service fluid pressure from a source thereof to manually actuate a fluid pressure responsive service member of a friction device operating cylinder which was operatively connected with a friction device. The friction device operating cylinder was also provided with an emergency or resiliently urged member responsive to emergency fluid pressure less than a predetermined value supplied thereto from another or an emergency fluid pressure source to drivingly actuate the service member and thereby mechanically effect emergency energization of the friction device. One of the undesirable or disadvantageous features of such past fluid pressure systems was the lack of control over the emergency energization of the friction device as to the extent or intensity thereof. In other words, the extent or intensity of the emergency energization of the friction device depended upon the extent of the depletion of the emergency fluid pressure below the predetermined value. For instance, if the emergency fluid pressure was depleted down to the predetermined value, the emergency energization of the friction device was normally rather gradual and of rather light intensity, whereas, if the emergency fluid pressure was completely depleted, the emergency energization of the friction device was immediate and very intense. In connection with the above, another disadvantageous or undesirable feature of such past fluid pressure systems was the lack of ability to effect a metered dissipation of the emergency fluid pressure and provide controlled emergency energization of the friction device. And still another disadvantageous or undesirable feature of such past fluid pressure systems was that separate service and emergency control valves were employed to effect the normal service and mechanical emergency energization of the friction device. In other words, if the service control valve failed to effect normal service energization of the friction device, the operator not only had to steer the vehicle under these emergency conditions, but also had to locate and actuate another emergency control valve in the vehicle in order to effect the mechanical emergency energization of the friction device.

Briefly, the present invention embodies a control valve having application means normally urged toward a position effecting the application of fluid pressure therethrough, said application means being movable in response to an applied force toward another position isolating the fluid pressure applied therethrough and metering the applied fluid pressure to the atmosphere. The invention also embodies other application means movable in said control valve in response to the applied force thereon to effect the application of other fluid pressure therethrough, and force transmitting means engageable between said first named and other application means in the event of the failure of said other fluid pressure to effect the applied force movement of said first named application means toward its other position. The invention further embodies a fluid pressure system having a pair of fluid pressure sources and a pair of fluid pressure responsive motors operatively controlled by said first named and other application means, one of said motors being operative to effect normal energization of a friction device in response to fluid pressure applied from one of said sources upon the actuation of said other application means, and the other of said motors being operative to effect emergency energization of said friction device in response to fluid pressure less than a predetermined value applied from the other of said sources when said first named application means is moved toward its other position.

In the drawings which illustrate embodiments of the invention,

FIG. 1 is a diagrammatic view illustrating a fluid pressure system embodied in the present invention, FIG. 2 is an enlarged sectional view showing the friction device operating mechanism in the system of FIG. 1 in cross-section, and FIG. 3 is an enlarged sectional view showing the control valve of FIG. 1 also embodied in the present invention in cross-section.

Referring now to the drawings in detail, a fluid pressure system 1 is provided with pressure generating means, such as a compressor 2, connected by a conduit 3 with a main or system reservoir 4, said compressor and main reservoir forming in combination a system fluid pressure source, and said system is also provided with service and emergency branches, indicated generally at 5, 6. The service branch 5 is provided with a conduit 7 connected between the main reservoir 4 and an inlet port 8 of a control valve 9, said conduit having a protected service or branch reservoir 10 interposed therein, and a unidirectional flow or check valve 11 is also connected in said conduit between said main and service reservoirs to protect said service reservoir against fluid pressure loss in the event of leakage or depletion of fluid pressure in said main reservoir. Another conduit or service line 12 is connected between an outlet port 13 of the control valve 9 and a service port 14 of a friction device operating mechanism or spring set brake cylinder 15 which is well known to the art. The emergency branch 6 is provided with a conduit 16 connected between the main reservoir 4 and another inlet port 17 of the control valve 9, said conduit having a protected emergency or branch reservoir 18 interposed therein, and another uni-directional flow or check valve 19 is also connected in said conduit between said main and emergency reservoirs to protect said emergency reservoir against fluid pressure loss in the event of leakage or depletion of fluid pressure in said main reservoir. Another conduit 20 is connected between another outlet port 21 of the control valve 9 and the emergency port 22 of the spring set brake cylinder 15, and a push-pull valve 23 is interposed in said conduit. The push-pull valve 23 is of a type well known to the art being manually operable between a connecting position providing pressure fluid communication between the control valve outlet port 21 and the cylinder emergency port 22 and a venting position interrupting the pressure fluid communication between said control valve outlet port and cylinder emergency port and venting said cylinder emergency port to the atmosphere.

The brake cylinder 15, FIG. 2, is provided with a fluid pressure responsive motor or diaphragm 24 engaged between interconnected housings 25, 26 defining with the housing 25 an expansible service chamber 27, and the service port 14 which receives the service line 11, as previously mentioned, is also provided in the housing 25 connecting with said service chamber. The diaphragm 24 is drivingly engaged with resiliently urged linkage or a push rod 28 which is, in turn, operatively connected with a friction device (not shown). Another fluid pressure responsive motor or stepped piston 29 is slidable in the housing 25 defining therewith an expansible emergency chamber 30 and extending into the service chamber 27 for driving mechanical engagement with the diaphragm 24. To complete the description of the system 1 and brake cylinder 12, the emergency port 22 which receives the conduit 20, as previously mentioned, is provided in the housing 25 connecting with the emergency chamber 30, and an emergency spring 31 is biased between said housing and the piston 29 urging said piston toward driving mechanical engagement with the diaphragm 24.

The control valve 9, FIG. 3, is provided with upper, intermediate and lower housing 32, 33, 34 which are interconnected by suitable means, such as studs 35, 36, and a seal 37 is sealably engaged between said intermediate and lower housings.

The upper housing 32 is provided with a bore 38 defining an annular wall or partition 39 axially positioned between a counterbore 40 and stepped counterbore 41 forming a set of inlet and outlet chambers, and a valve seat 42 is defined on said wall in circumscribing relation with said bore. The inlet port 8 which receives the conduit 7, as previously mentioned, is provided in the upper housing 32 connecting with the counterbore 40, and the outlet port 13 which receives the conduit 12, as previously mentioned, is also provided in said upper housing connecting with the counterbore 41. A recess 43 is provided in the upper portion of the intermediate housing 33 beneath the counterbore 40 forming an exhaust chamber in combination with a communicating exhaust passage and port 44, 45 provided in the upper housing 32. A valve guide member 46 is received in the lower end of the counterbore 40 in engagement with a shoulder 47 provided on the intermediate housing 33 in the recess 43 thereof. The valve guide member 46 is provided with a bore 48 in which an inlet valve element 49 is slidable, and seals 50, 51 are carried by said valve guide member in sealing engagement with the counterbore 40 and said inlet valve element, respectively. The inlet valve element 49 is provided with an axial bore or exhaust opening 52 therethrough and an annular sealing member or disc 53 is provided on the upper end of said inlet valve element in circumscribing relation with said exhaust opening, said sealing member being normally urged into sealing engagement with the upper housing valve seat 42 by a valve spring 54 biased between said inlet valve element and the valve guide member 46.

An application or valve control member 55 is slidably received in the counterbore 41 and carries a seal 56 in sealing engagement with said counterbore. The valve control member or piston 55 is provided with a valve seat 57 on the lower end thereof which is coaxial with the upper housing bore 38 and normally maintained in spaced relation with the inlet valve seal 53 by a return spring 58 biased between said piston and the upper housing 32. A metering spring bore 59 is provided in the piston 55, and a pre-compressed metering spring 60 is retained therein by a retainer or treadle force receiving plate 61 which is biased into abutment with a snap ring and groove assembly 62 provided in the upper end of said metering spring bore.

The intermediate housing 33 is prfovided with a radially extending or transverse wall portion 63 between the recess 43 adjacent the upper side of said wall and another recess 64 provided in said intermediate housing adjacent the lower side of said wall, and the outlet port 21 which receives the conduit 20, as previously mentioned, is provided in said intermediate housing connecting with the recess 64. An axial extension 65 is integrally provided in the lower side of the intermediate housing wall 63 defining a valve seat 66 on the free end thereof, and a stepped bore 67 is axially provided through said intermediate housing wall, said extension and said valve seat. The intermediate housing wall 63 is also provided with a passage 68 which communicates the larger portion of the stepped bore 67 with the upper recess 43 in the intermediate housing 33.

The lower housing 34 is provided with an axial bore 69 which connects with the intermediate housing recess 64, and the inlet port 17 which receives the conduit 16, as previously mentioned, is provided in said lower housing connecting with said lower housing bore adjacent to the lower end wall thereof. An application or valve control member 70 is slidably received in the lower housing bore 69 between the inlet and outlet ports 17, 21 having a peripheral seal 71 thereon in sealing engagement with said lower housing bore. The valve control member or emergency piston 70 is provided with a bore 72 and counterbore 73 which extend coaxially therethrough, and a valve seat 74 is defined at the juncture of said piston bore and counterbore. A plurality of cross-passages 75 in the piston 70 connect the piston counterbore 73 with the lower housing bore 67 and the inlet port 17 at all times. A force receiving plate or member 76 is positioned in the piston counterbore 73 against displacement by a snap ring and groove assembly 77 provided in said piston counterbore adjacent to the lower end thereof, and a return spring 78 biased between the lower housing 34 and said force receiving plate normally urges the piston 70 toward abutment with a stop or abutment portion 79 provided on the lower side of the intermediate housing wall 63. The piston bore and counterbore 72, 73 are normally concentrically or coaxially arranged with the extension 65 on the intermediate housing wall 63, and said extension normally protrudes coaxially through the piston valve seat 74. It should be noted that the recess 64 in the intermediate housing 33 and the portion of the lower housing bore 69 above the emergency piston 70 define an outlet chamber 80 in pressure fluid communication with the outlet port 21 at all times and that the counterbore 73 of said emergency piston and the portion of said lower housing bore below said emergency piston defines an inlet chamber 81 in pressure fluid communication with the inlet port 17 at all times.

An inlet valve element 82 is positioned in the emergency piston counterbore 73 being provided with an axial bore or passage 83 therethrough, and an annular sealing member or disc 84 is provided on the upper end of said inlet valve element in circumscribing relation with said inlet valve element bore, said sealing member being normally urged into sealing engagement with the valve seat 66 on the intermediate housing extension 65 by a valve spring 85 biased between said inlet valve element and the force receiving plate 76 to interrupt pressure fluid communication between the outlet and exhaust ports 21, 45. It should also be noticed that when the emergency piston 70 is urged into engagement with the stop 79, the valve seat 74 on said emergency piston is disengaged from the valve member 82 to establish open pressure fluid communication between the outlet and inlet chamber 80, 81 and the inlet and outlet ports 17, 21. The emergency piston 70 is provided with opposed, substantially equal cross-sectional effective input and output areas $A_1$, $A_2$ on opposite sides of the seal 71 when said emergency piston is urged to its normal position (as shown in FIG. 3) into engagement with the stop 79 with the emergency piston valve seat 74 disengaged from the valve member 82, said input and output areas $A_1$, $A_2$ being respectively responsive to fluid pressure at the inlet and outlet ports 17, 21.

A force transmitting member or push rod 86 is slidably received in the smaller of the stepped bores 67 in the intermediate housing wall 63 and the valve member bore 83, and a peripheral seal 87 is provided on said push rod in sealing engagement with said valve member bore. The lower end of the push rod 86 defines an abutment 88 in driving engagement with the force receiving plate 76 of the emergency piston 70. The push rod 86 also extends coaxially through the exhaust opening 52 in the valve member 49, and the upper end thereof is slidably received in a centrally located bore 89 provided through the valve seat 57 of the actuating piston 55 and connecting with the metering spring bore 59. To complete the description of the control valve 9, an abutment surface 90 is provided on the push rod 86 adjacent to the upper end thereof in predetermined spaced relation with the lower end of the piston 55.

In the operation with the compartment parts of the control valve 9 positioned as above described and the push-pull valve 23 in the connecting position thereof, fluid pressure generated by the compressor 2 flows through the conduit 3 to the main reservoir 4 and therefrom to the conduit 7, the uni-directional valve 11, and service reservoir 10 of the service branch 5 into the inlet port and chamber 8, 40 of the control valve 9. The fluid pressure also flows from the main reservoir 4 through the conduit 16, the uni-directional valve 19 and emergency reservoir 18 of the emergency branch 6 into the inlet port 17 of the control valve 9 and therefrom through the lower housing bore 69, the cross-passage, counterbore and bore 75, 73 and 72 of the emergency piston 70, the outlet chamber and port 80, 21, the conduit 20 and the push-pull valve 23 into the emergency port and chamber 22, 30 of the brake cylinder 15. When the established fluid pressure in the cylinder emergency chamber 30 acting on the effective area of the stepped piston 29 therein exceeds a predetermined value, said stepped piston is urged in a leftward direction toward its normal or inoperative position against the emergency spring 31 to contain the compressive force thereof (as shown in FIG. 2).

If the operator desires to effect a service braking application under normal operating conditions, a manually applied force on the force receiving plate 61 of the control valve 9 is transmitted through the metering spring 60 to the piston 55 to move said piston downwardly against the compressive force of the return spring 58. This downward movement initially engages the piston valve seat 57 with the valve member 49 closing the exhaust passage 52 thereof and isolating the outlet chamber 41 from the atmosphere, and said downward movement thereafter urges said valve member against the valve spring 54 to a position disengaged from the upper housing valve seat 42 to establish pressure fluid communication between the inlet and outlet ports 8, 13. The fluid pressure flows in the service branch 5 from the inlet port 8 through the inlet chamber 40, the connecting bore or passage 38, the outlet chamber 41, the outlet port 13, the service line 12, and through the service port 14 of the brake cylinder 15 into the service chamber 27 thereof. The fluid pressure so established in the brake cylinder service chamber 27 acts on the effective area of the diaphragm 24 to create an application force which moves said diaphragm and the linkage 28 rightwardly in a direction to effect energization of the friction device (not shown) associated therewith.

When the reaction force created by the established fluid pressure in the control valve outlet chamber 41 acting on the effective area of the piston 55 therein equals the manually applied force, said piston is moved upwardly against the metering spring 60 wherein the inlet valve 49 is positioned in lapped engagement with the upper housing valve seat 42, and the piston valve seat 57 is positioned in lapped engagement with said inlet valve. The reaction force acting through the metering spring 60 affords the operator a direct and accurate "feel" as to the extent or intensity of the braking effort or application. If a greater braking application is desired, the manually applied force is increased which results in an increased application force to further energize the friction device, as well as an increased reaction force, and the component parts of the control valve 9 function in the same manner, as previously described, to again move said component parts to their lapped positions.

When the desired braking effort is attained, the manually applied force is removed from the piston 55, and the return spring 58 moves said piston upwardly toward its original position. Since the valve element 49 is urged by its spring 54 into engagement with the upper housing valve seat 39 interrupting pressure fluid communication between the inlet and outlet ports 8, 13, this upward movement of the piston 55 disengages the valve seat 57 thereof from said valve element to again open the valve element exhaust passage 52 reestablishing communication between the outlet and exhaust ports 13, 45. In this manner, fluid pressure is exhausted to the atmosphere from the cylinder service chamber 27 through the cylinder service port 14, the service line 12, the outlet port 13, the outlet chamber 41, the exhaust passage 52 of the valve element 49, the intermediate housing recess 43 and the exhaust passage and port 44, 45 of the upper housing 32. Upon such exhaustion of the fluid pressure from the cylinder emergency chamber 27, the application force is, of course, eliminated, and the diaphragm 24 and linkage 28 return to their original positions effecting the de-energization of the friction device associated therewith.

In the event of failure of the service branch 5 with a resultant loss of the fluid pressure in the service reservoir 10 to effect emergency vehicle operating conditions, the manualy applied force moves the piston 55 downwardly to actuate the valve member 49; and, since it was assumed that the service branch 5 has failed effecting an emergency condition, the establishment of fluid pressure in said service branch to effect the normal service energization of the friction device, as previously described, is obviated. Of course, when such service energization of the friction device is not effected due to the aforementioned failure of the service branch, the natural instinct or tendency of the operator is to increase the applied force, i.e., further actuate the force applying treadle or pedal, and in this manner, further downward movement of the piston 55 drivingly engages said piston with the push rod abutment surface 90 to thereafter effect concerted downward movement of the push rod 86 and emergency piston 70 therewith. This concerted downward movement of the pistons and push rod 55, 70, 86 initially moves the emergency piston valve seat 74 into sealing engagement with the valve member 82 to isolate the fluid pressure at the inlet port 17 from that at the outlet port 21 and thereafter moves said valve member to a position disengaged from the extension valve seat 66 to establish metered pressure fluid communication between the outlet and exhaust ports 21, 45. The metered exhaustion of fluid pressure is effected from the brake cylinder emergency chamber and port 30, 22 to the atmosphere through the conduit 20, the push-pull valve 23, the control valve outlet port 21, the outlet chamber 80, the larger stepped bore 67 and passage 68 in the intermediate housing 33, the recess 43 and the exhaust passage and port 44, 45. When the fluid pressure in the brake cylinder emergency chamber 30 acting on the effective area of the stepped piston 29 therein is reduced below the predetermined minimum value, the compressive force of the emergency spring 31 concertedly moves said stepped piston, the diaphragm 24 and linkage 28 in a rightward direction to mechanically effect energization of the friction device (not shown) under emergency conditions. When the valve member 82 is disengaged from the valve seat 66 to effect such metered exhaustion of the fluid pressure from the brake cylinder emergency chamber 30, it should be noted that the cross-sectional effective area $A_3$ of the valve member 82 and push rod 86, which is substantially equal to the cross-sectional area of the valve seat 66, is additive to the input area $A_1$ wherein the effective input area is now $A_1 + A_3$ while the output area $A_2$ remains substantially the same. Therefore, the relatively constant fluid pressure isolated at the inlet port 17 acts on the effective input area $A_1 + A_3$ in opposition to the reduced fluid pressure at the outlet port 21 acting on the output area $A_2$ to establish a differential reaction force across the emergency piston 70 which is transmitted through the push rod 86 and piston 55 to the metering spring 60 is opposition to the manually applied force thereon.

When the magnitude of the differential reaction force equals that of the applied force, the pistons and push rod 55, 70, 86 are concertedly moved upwardly against the metering spring 60 wherein the valve member 82 is positioned in lapped engagement with the extension valve seat 66 and the emergency piston valve seat 74. The differential reaction force acting through the metering spring affords the operator a direct and accurate "feel" as to the extent or intensity of the braking effort or application under emergency conditions. If a greater braking effort is desired under emergency conditions, the manually applied force is increased which results in an increased differential reaction force wherein the component parts of the control valve 9 function in the same manner, as previously described, to again move said component parts to their lapped positions, and the compressive force of the emergency spring 31 is responsive to such further metered exhaustion of the fluid pressure in the brake cylinder emergency chamber 30 to increase the mechanical energization of the friction device under emergency conditions, as previously described.

When the desired braking effort is obtained under emergency conditions, the manually applied force is removed from the piston 55, and the differential reaction force plus the force of the springs 54, 58, 78 serve to move the component parts of the control valve 9 upwardly toward their original positions. Since the valve member 82 is urged by its spring 85 into engagement with the extension valve seat 66 interrupting pressure fluid communication between the outlet and exhaust ports 21, 45, the upward movement of the emergency piston 70 into engagement with the stop 79 disengages the valve seat 74 from the valve member 82 to re-establish pressure fluid communication between the inlet and outlet ports 17, 21, and the push rod 86 and piston 55 are also concertedly driven upwardly toward their original positions in response to the upward movement of said emergency piston. In this manner, fluid presure again flows from the inlet port 17 through the inlet and outlet chambers 81, 80, the outlet port 21, the conduit 20 and the brake cylinder emergency port 22 into the brake cylinder chamber 30. When the fluid pressure in the brake cylinder chamber 30 is re-established to a value in excess of the predetermined value, the force of the re-established fluid pressure in said chamber acting on the effective area of the stepped piston 29 therein again urges said stepped piston leftwardly toward its normal or inoperative position to contain the compressive force of the emergency spring 31, and the diaphragm and linkage 24, 28 are concertedly movable with said stepped piston in the leftward direction toward their normal or inoperative positions to effect the deenergization of the friction device under emergency conditions.

If the operator now desires to park the vehicle, the push-pull valve 23 is manually moved to the venting position thereof interrupting pressure fluid communication between the control valve outlet port 21 and the brake cylinder emergency port 22 and venting said brake cylinder emergency port to atmosphere, as previously mentioned. In this manner, the fluid pressure in the brake cylinder emergency chamber 30 is "dumped" to atmosphere through the brake cylinder emergency port 22, the conduit 20 and the push-pull valve 23 to effect simulated emergency operation of the brake cylinder 15 wherein the compressive force of the emergency spring 31 again concertedly moves the stepped piston, diaphragm and linkage 29, 24, 28 rightwardly to effect mechanical energization of the friction device. While it is prefered to actuate the push-pull valve 23 only for parking purposes, as previously described, said push-pull valve can be actuated independently of the control valve 9 to effect energization of the friction device under emergency conditions; however, it is obvious from the foregoing that actuation of said control valve meters fluid pressure under emergency conditions to provide a controlled energization of the friction device whereas actuation of said push-pull valve "dumps" fluid pressure which, of course, results in sudden, erratic and uncontrolled energization of said friction device.

It is now apparent that a novel system 1 and control valve 9 therefor meeting the objects and advantages set out hereinbefore, as well as other objects and advantages apparent from the disclosure, are provided and that changes in the precise configurations, shapes or details of the constructions set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a pair of ports therein, application means movable in said housing between one position effecting the application of fluid pressure from one of said ports to the other of said ports and another position isolating the fluid pressure at said one port and metering the applied fluid pressure at said other port to the atmosphere, and opposed effective areas on said application means respectively responsive to the isolated and reduced applied fluid pressures at said one and other ports to establish a force urging said application means toward the one position when said application means is in the other position thereof.

2. The control valve according to claim 1 comprising another pair of ports in said housing, other application means movable in said housing and controlling pressure fluid communication between said other pair of ports, said other application means being normally movable toward a position in said housing establishing pressure fluid communication between said other pair of ports, and means for force transmitting engagement between said first named and other application means responsive to the applied force movement of said other application means in excess of a predetermined amount to move said first named application means toward its other position and transmit said first named force to said other application means in opposition to the applied force thereon.

3. A control valve comprising a housing having inlet and outlet ports therein, application means movable in said housing and normally urged toward a position establishing pressure fluid communication between said inlet and outlet ports, said application means being movable in response to an applied force toward another position interrupting pressure fluid communication between said inlet and outlet ports and metering the established fluid pressure at said outlet port to the atmosphere to reduce the magnitude thereof, and opposed areas in said application means respectively responsive to the fluid pressure at said inlet port and the metered reduction of the established fluid pressure at said outlet port to establish a differential reaction force across said application means and acting in a direction opposite to the applied force when said application means is in the other position thereof.

4. The control valve according to claim 3 comprising other inlet and outlet ports in said housing, other application means movable in said housing and controlling pressure fluid communication between said other inlet and outlet ports, said other application means being movable in response to an applied force thereon toward a position in said housing establishing pressure fluid communication between said other inlet and outlet ports, and a force transmitting member movable in said housing and connected in lost motion engagement between said first named and other application means, said force transmitting member being movable in response to the applied force movement of said other application means in excess of a predetermined amount to transmit the applied force to said first named application means effecting actuation thereof toward its other position and to transmit the differential reaction force to said other application means in opposition to the applied force thereon when said first named application means is in its other position.

5. The control valve according to claim 3 comprising valve means normally urged toward a position in said housing interrupting pressure fluid communication between said outlet port and the atmosphere, and said application means including a valve control member for operative engagement with said valve means and normally disengaged therefrom to establish the pressure fluid communication between said inlet and outlet ports, said valve control member being movable in response to the applied force toward the other position thereof to initially engage said valve means interrupting the pressure fluid communication between said inlet and outlet ports and thereafter actuate said valve means to effect the metered reduction of the established fluid pressure at the outlet port.

6. The control valve according to claim 3 comprising an exhaust port in said housing, and a valve seat on said housing between said outlet and exhaust ports, said valve means being normally urged into engagement with said valve seat to interrupt pressure fluid communication between said outlet and exhaust ports and being actuated in response to the applied force movement of said valve control member to a position disengaged from said valve seat to meter the established fluid pressure at said outlet port to said exhaust port.

7. The control valve according to claim 3 comprising a valve seat on said valve control member normally urged toward a position disengaged from said valve means, passage means in said valve control member between said inlet and outlet ports and extending through said valve seat, said valve seat being movable into engagement with said valve means to close said passage means and thereafter actuate said valve means in response to the applied force movement of said valve control member.

8. The control valve according to claim 3 comprising a valve seat on said housing between said outlet port and the atmosphere, another valve seat on said valve control member between said inlet and outlet ports, said valve means being normally urged into engagement with said first named valve seat to interrupt pressure fluid communication between said outlet port and the atmosphere and said other valve seat being normally disengaged from said valve means to establish pressure fluid communication between said inlet and outlet ports, and said other valve seat being movable in response to the applied force movement of said valve control member to engage said valve means interrupting pressure fluid communication between said inlet and outlet ports and thereafter move said valve means toward a position disengaged from said first named valve seat and effecting metered exhaustion of the established fluid pressure at said outlet port to the atmosphere.

9. The control valve according to claim 8 comprising an exhaust port in said housing, passage means extending through said first named valve seat between said outlet and exhaust ports, said passage means being closed when said valve means is engaged with said first named valve seat, and other passage means in said valve control member extending through said other valve seat, said other passage means being open when said other valve seat is disengaged from said valve means, and the applied force movement of said valve control member serving to engage said other valve seat with said valve means closing said other passage means and to thereafter disengage said valve means from said first named valve seat opening said first named passage means.

10. The control valve according to claim 3 wherein said valve control member defines with said housing opposed inlet and outlet chambers respectively connected with said inlet and outlet ports, an exhaust port in said housing, extension means in said housing extending into said outlet chamber, a valve seat on said extension means, passage means extending through said extension means between said outlet chamber and exhaust port, other passage means in said valve control member between said inlet and outlet chambers and coaxial with said extension means, said valve means being movable in said other passage means and normally urged into engagement with said valve seat closing said first named passage means, and another valve seat on said valve control member in circumscribing relation with said other passage means and normally disengaged fom said valve means, the applied force movement of said valve control member serving to move said other valve seat into engagement with said valve means closing said other passage means and to thereafter move said valve means toward a position disengaged from said first named valve seat opening said first named passage means.

11. The control valve according to claim 3 comprising a bore in said housing having opposed lower and upper end walls, said inlet and outlet ports connecting with said bore adjacent to said lower and upper end walls, respectively, said valve control member including piston means slidable in said bore between said inlet and outlet ports and said opposed areas being provided on said piston means, a stop in said bore for said piston means, a return spring engaged with said lower end wall normally urging said piston means toward said upper end wall and into engagement with said stop, an exhaust port in said housing, extension means on said upper end wall extending coaxially into said bore and having a free end therein defining a valve seat, passage means in said housing and extension means extending axially through said valve seat and connecting said exhaust port with said housing bore, said upper end wall thereof and said piston means, a stepped bore extending axially through said piston means, the smaller portion of said stepped bore being coaxial with said extension means when said piston means is engaged with said stop, said valve means being movable in the larger portion of said stepped bore, a valve spring engaged between said piston means and valve means normally urging said valve means into engagement with said valve seat closing said passage means and interrupting pressure fluid communication between said outlet and exhaust ports, a radial shoulder on said piston means between the smaller and larger portions of said stepped bore defining another valve seat normally disengaged from said valve means to establish pressure fluid communication between said inlet and outlet ports when said piston means is engaged with said stop, another bore in said valve means coaxial with said passage means, a push rod slidable in said housing and said valve means bore and extending coaxially through said first named valve seat, and an abutment end on said push rod extending into the larger portion of said stepped bore and drivingly engaged with said piston means, said piston means being movable against said return spring and from engagement with said stop in response to the applied force on said push rod to initially engage said other valve seat with said valve means isolating said inlet port from said outlet port and thereafter disengage said valve means from said first named valve seat to open said passage means and effect the metered reduction of the fluid pressure from said outlet port to said exhaust port.

12. The control valve according to claim 5 comprising another pair of inlet and outlet ports in said housing, other valve means controlling pressure fluid communication between said other inlet and outlet ports, another valve control member movable in said housing for operative engagement with said other valve means, said other valve control member being normally movable less than a predetermined amount in response to the applied force thereon to engage and move said other valve means toward a position establishing pressure fluid communication between said other inlet and outlet ports and said other valve control member also being further movable in excess of the predetermined amount in the event of fluid pressure failure at said other outlet port, and means movable in said housing and defining a lost motion connection between said first named and other valve control members upon the applied force movement of said other valve control member in excess of the predetermined amount, said last named means being movable in response to the applied force movement of said other valve control member in excess of the predetermined amount to effect the applied force movement of said first named application means toward its other position and transmit the differential reaction force to said other valve control member when said first valve control member is in its other position.

13. The control valve according to claim 12 wherein said last named means includes a push rod having opposed ends, one of said opposed ends defining the lost motion connection with one of said first named and other valve control members.

14. The control valve according to claim 13 comprising a valve chamber in said first named valve control member, said valve means being movable in said valve chamber, and an opening in said valve means, said push rod having an intermediate portion between said one end and the other end thereof slidable in said valve means opening.

15. The control valve according to claim 12 comprising an exhaust port in said housing, and a valve seat on said housing between said first named outlet port and exhaust port, said first named valve means being normally urged into engagement with said valve seat to close communication between said first named outlet port and exhaust port and being actuated toward an open position disengaged from said valve seat to meter the established fluid pressure at said first named outlet port to said exhaust port in response to the applied force movement of said first named valve control member toward its other position.

16. The control valve according to claim 12 comprising passage means in said first named valve control member between said first named inlet and outlet ports, a valve seat on said first named valve control member in circumscribing relation with said passage means for engagement with said first named valve means and normally disengaged therefrom to maintain said passage means open, said valve seat being movable into engagement with said first named valve means to close said passage means and thereafter actuate said first named valve means in response to the applied force movement of said first named valve control member toward its other position.

17. The control valve according to claim 12 comprising a pair of valve seats on said housing and said first named valve control member, passage means extending through said housing valve seat between said first named outlet port and the atmosphere, other passage means extending through said valve control member valve seat between said first named inlet and outlet ports, said first named valve means being normally urged into engagement with said housing valve seat to close said first named passage means and said valve control member valve seat being normally urged to a position disengaged from said first named valve seat to normally maintain said other passage means open, and said valve control member valve seat being initially movable in response to the applied force movement of said first named valve control member to engage said first named valve seat closing said other passage means and thereafter further movable to disengage said first named valve means from said housing valve seat opening said first named passage means and effecting the metered reduction of the established fluid pressure at said first named outlet port to the atmosphere.

18. The control valve according to claim 17 comprising an opening in said valve means, said last named means including a push rod extending coaxially through said housing valve seat and said valve control member valve seat and being slidable in said opening, an abutment end on said push rod drivingly engaged with said first named valve control member, and another abutment end on said push rod opposite said first named abutment end and defining with said other valve control member the lost motion connection upon the applied force movement of said other valve control member in excess of the predetermined amount.

19. A fluid pressure system for effecting normal and mechanical energization of a friction device comprising a pair of fluid pressure sources, a fluid pressure responsive motor actuated in response to fluid pressure applied thereto from one of said sources to effect the normal energization of said friction device, a resiliently urged motor actuated in response to fluid pressure applied thereto less than a predetermined value from the other of said sources to effect the mechanical energization of said friction device, and control means including a housing having a pair of fluid pressure passage means therein connected between said one and other sources and said first named motor and resiliently urged motor, respectively, a pair of application means movable in said housing and controlling the application of fluid pressure through said passage means, one of said application means being movable in response to an applied force to a position in one of said passage means applying fluid pressure therethrough from said one source to actuate said first named motor and effect the normal energization of said friction device, the other of said application means being normally urged to a position in the other of said passage means applying fluid pressure in excess of the predetermined value therethrough from said other source to said resiliently urged motor, and force transmitting means responsive to the applied force movement of said one application means in excess of a predetermined amount to urge said other application means toward another position in said other passage means isolating said resiliently urged motor from said other source and exhausting the applied fluid pressure from said resiliently urged motor to the atmosphere, said resiliently urged motor being actuated upon the reduction of the fluid pressure applied thereto to a value less than the predetermined value to mechanically energize said friction device.

References Cited by the Examiner
UNITED STATES PATENTS
3,188,916  6/1965  Beatty _____ 91—165

EUGENE G. BOTZ, *Primary Examiner.*